United States Patent [19]

Nakano et al.

[11] Patent Number: 5,565,391
[45] Date of Patent: Oct. 15, 1996

[54] DIELECTRIC CERAMIC MATERIAL AND METHOD FOR MAKING

[75] Inventors: Mutsuko Nakano; Makoto Kobayashi, both of Chiba, Japan

[73] Assignee: TDK Corporation, Tokyo, Japan

[21] Appl. No.: 246,159

[22] Filed: May 19, 1994

[30] Foreign Application Priority Data

May 20, 1993 [JP] Japan .................................. 5-141450

[51] Int. Cl.$^6$ .................................................. C04B 35/26
[52] U.S. Cl. ........................................................... 501/135
[58] Field of Search ............................ 501/135; 252/63.2

[56] References Cited

U.S. PATENT DOCUMENTS

| | | | |
|---|---|---|---|
| 4,078,938 | 3/1978 | Yonezawa et al. | 106/39.5 |
| 4,216,102 | 8/1980 | Furukawa et al. | 252/63.2 |
| 4,216,103 | 8/1980 | Juujiwara et al. | 252/63.2 |
| 4,235,635 | 11/1980 | Iizawa et al. | 106/39.5 |
| 4,287,075 | 9/1981 | Fujiwara et al. | 252/63.2 |
| 4,544,644 | 10/1985 | Yamashita et al. | 501/134 |
| 4,885,267 | 12/1989 | Takahara et al. | 501/134 |
| 5,011,803 | 4/1991 | Park et al. | 501/136 |
| 5,182,695 | 1/1993 | Handa et al. | 501/135 |
| 5,459,115 | 10/1995 | Kagata et al. . | |

FOREIGN PATENT DOCUMENTS

| | | |
|---|---|---|
| 0121161 | 10/1984 | European Pat. Off. . |
| 0192779 | 9/1986 | European Pat. Off. . |
| 0589441 | 3/1994 | European Pat. Off. . |
| 2701411 | 7/1977 | Germany . |
| 52-87700 | 7/1977 | Japan . |
| 56-156609 | 12/1981 | Japan . |
| 4-325454 | 11/1992 | Japan . |
| 5-20925 | 1/1993 | Japan . |

OTHER PUBLICATIONS

Proceedings of the 10th Meeting on Ferroelectric Materials and Their Applications Kyoto 1993, pp. 179–180, "Pb(Fe$_{2/3}$W$_{1/3}$)O$_3$–(PbCa)(Fe$_{1/2}$Nb$_{1/2}$)O$_3$" (no month).

Jpn. J. Appl. Phys., vol. 32, 1993, No. 9B, Sep. 1993, pp. 4314–4318, Mutsuko Nakano, et al., "Low-Temperature-Fireable Dielectric Material Pb(Fe$_{2/3}$W$_{1/3}$)O$_3$–(Pb,Ca)(Fe$_{1/2}$Nb$_{1/2}$)O$_3$ For Microwave Use".

Jpn. J. Appl. Phys., vol. 31, 1992, No. 9B, Sep. 1992, pp. 3144–3147, Junichi Kato, et al., "Dielectric Properties of (PbCa)(MeNb)O$_3$ at Microwave Frequencies".

Ceramic Bulletin, vol. 62, No. 2 (1983), pp. 216–218, Sei-Joo Jang, et al., "Low-Firing Capacitor Dielectrics In The System Pb(Fe$_{2/3}$W$_{1/3}$)O$_3$–Pb(Fe$_{1/2}$Nb$_{1/2}$)O$_3$–Pb$_5$Ge$_3$O$_{11}$" (no month).

Proceedings of the 1st Meeting on Ferroelectric Materials and Their Applications, Kyoto, 1977, "Properties of Pb(Fe$_{2/3}$W$_{1/3}$)O$_3$–Pb(Fe$_{1/2}$Nb$_{1/2}$)O$_3$ Ceramics", Masatomo Yonezawa, et al., pp. 297–301 (no month).

*Primary Examiner*—Deborah Jones
*Attorney, Agent, or Firm*—Oblon, Spivak, McClelland, Maier & Neustadt, P.C.

[57] ABSTRACT

A dielectric ceramic material containing lead, calcium, tungsten, iron, and niobium in oxide form has a primary phase of the composition: $(Pb_{1-z}Ca_z)(W_sFe_tNb_u)O_3$ wherein $0.3 \leq z \leq 0.9$, $s+t+u=1$, $0.01 \leq s \leq 0.2$, $0.5 \leq t \leq 0.6$, and $0.2 \leq u \leq 0.49$. The material which can be effectively fired at low temperature has a minimal temperature coefficient of resonance frequency in the microwave frequencies, a high dielectric constant, and a high Q·f value.

10 Claims, 3 Drawing Sheets

RELATIONSHIP OF FIRED DENSITY TO FIRING TEMPERATURE

DIELECTRIC CERAMIC MATERIAL AND METHOD FOR MAKING

BACKGROUND OF THE INVENTION

This invention relates to a dielectric ceramic material and more particularly, to a dielectric ceramic material suitable for forming resonators designed to operate in the microwave frequencies. It also relates to a method for preparing the same.

To meet the current drastically increasing demand for mobile radio communications, it is strongly required to reduce the size of equipment used therefor. In such communications, filters, diplexers and other circuits including resonator elements are used for frequency selection. The resonators must be reduced in size before the size reduction requirement of communication equipment can be met. The resonators consist of dielectric elements. Since the size of dielectric resonators is in inverse proportion to the square root of the dielectric constant of dielectric materials, a material having a greater dielectric constant must be found in order to enable size reduction of resonators. A shift of service frequency toward a higher frequency requires to increase the packing density of parts, which in turn, requires further size reduction. There are some attempts to form circuits from multilayer dielectric substrates.

Under the circumstances, the dielectric materials have to meet not only conventional requirements including a high dielectric constant in the microwave frequencies and a low temperature coefficient τf of resonance frequency, but also be co-firable with conductors. Among prior art microwave dielectric materials, $Ba(Mg_{1/3}Ta_{2/3})O_3$ and $Ba(Zn_{1/3}Ta_{2/3})O_3$ are known to have a high dielectric constant in the microwave frequencies. However, since these microwave dielectric materials including $Ba(Mg_{1/3}Ta_{2/3})O_3$ and $Ba(Zn_{1/3}Ta_{2/3})O_3$ have a firing temperature as high as about 1,300° C., it is difficult to achieve fine or complex networks of conductor when the dielectric material is co-fired with the conductor. Inversely, those dielectric materials having a lower firing temperature have a low dielectric constant, for example, a (glass + $TiO_2$) system having a dielectric constant of about 10.

SUMMARY OF THE INVENTION

Therefore, an object of the present invention is to provide a dielectric ceramic material which is low-temperature firable and has a minimal temperature coefficient of resonance frequency in the microwave frequencies, a high dielectric constant, and a high Q·f value. Another object of the present invention is to provide a method for preparing such a dielectric ceramic material.

The present invention provides a dielectric ceramic material comprising lead, calcium, tungsten, iron, and niobium in oxide form. It contains a primary phase of the composition: $(Pb_{1-z}Ca_z)(W_sFe_tNb_u)O_3$. Letters z, s, t, and u representative of the molar fractions of Ca, W, Fe, and Nb, respectively, are in the range: $0.3 \leq z \leq 0.9$, $s+t+u=1$, $0.01 \leq s \leq 0.2$, $0.5 \leq t \leq 0.6$, and $0.2 \leq u \leq 0.49$. Preferably, s, t and u are in the range: $0.02 \geq s \leq 0.1$, $0.5 \leq t \leq 0.55$, and $0.35 \leq u \leq 0.48$. In a preferred embodiment, the dielectric ceramic material further contains at least one of $(Pb_{1-x}Ca_x)(Fe_{1/2}Nb_{1/2})O_3$, $Ca(Fe_{1/2}Nb_{1/2})O_3$, and $Pb_3Nb_4O_{13}$ as a distinct phase. Letter x is in the range: $0.3 \leq xx \leq 0.91$.

Preferably, the dielectric ceramic material further contains a sintering aid as a subordinate component. A typical sintering aid is $Pb_5Ge_3O_{11}$. The sintering aid is present in an amount of up to 10.0% by weight of the total weight of the lead, calcium, tungsten, iron, and niobium oxides. The dielectric ceramic material may further contain manganese, preferably in an amount of up to 0.5% by weight of the total weight of the lead, calcium, tungsten, iron, and niobium oxides (exclusive of the sintering aid).

According to the present invention, the dielectric ceramic material defined above is prepared by the steps of:

forming a first ceramic material composed mainly of $Pb(Fe_{2/3}W_{1/3})O_3$ and a second ceramic material composed mainly of $(Pb_{1-x}Ca_x)(Fe_{1/2}Nb_{1/2})O_3$ wherein molar fraction x is in the range: $0.3 \leq x \leq 0.91$, mixing the first and second ceramic materials, calcining the mixture, and firing the mixture.

Preferably, the first and second ceramic materials are mixed to form a mixture represented by the compositional formula:

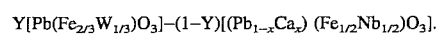

$$Y[Pb(Fe_{2/3}W_{1/3})O_3]–(1–Y)[(Pb_{1-x}Ca_x)(Fe_{1/2}Nb_{1/2})O_3].$$

Letter x is as defined above and y representative of the molar fraction of the first ceramic material is in the range: $0.01 \leq y \leq 0.7$, more preferably $0.05 \leq y \leq 0.4$. In the firing step, the mixture is preferably fired at a temperature of up to 1,100° C.

ADVANTAGES

In a dielectric ceramic material represented by the general formula: $(Pb_{1-z}Ca_z)(W_sFe_tNb_u)O_3$, which is sometimes referred to as PCWFN, when the contents of respective components are limited to the range: $0.3 \leq z \leq 0.9$, $s+t+u=1$, $0.01 \leq s \leq 0.2$, $0.5 \leq t \leq 0.6$, and $0.2 \leq u \leq 0.49$, the material can be effectively fired at a sufficiently low temperature to enable co-firing with conductors. Due to a minimal temperature coefficient of resonance frequency in the microwave frequencies, a high dielectric constant, and a high Q·f value, the dielectric material is useful to form resonators having good properties in the microwave frequencies.

Low-temperature firing is enhanced by the addition of $Pb_5Ge_3O_{11}$. Additional inclusion of manganese contributes to an increase of insulation resistance. Then the dielectric material is also suitable to form capacitors to be incorporated in high-frequency circuits.

DETAILED DESCRIPTION OF THE INVENTION

Figure 1:
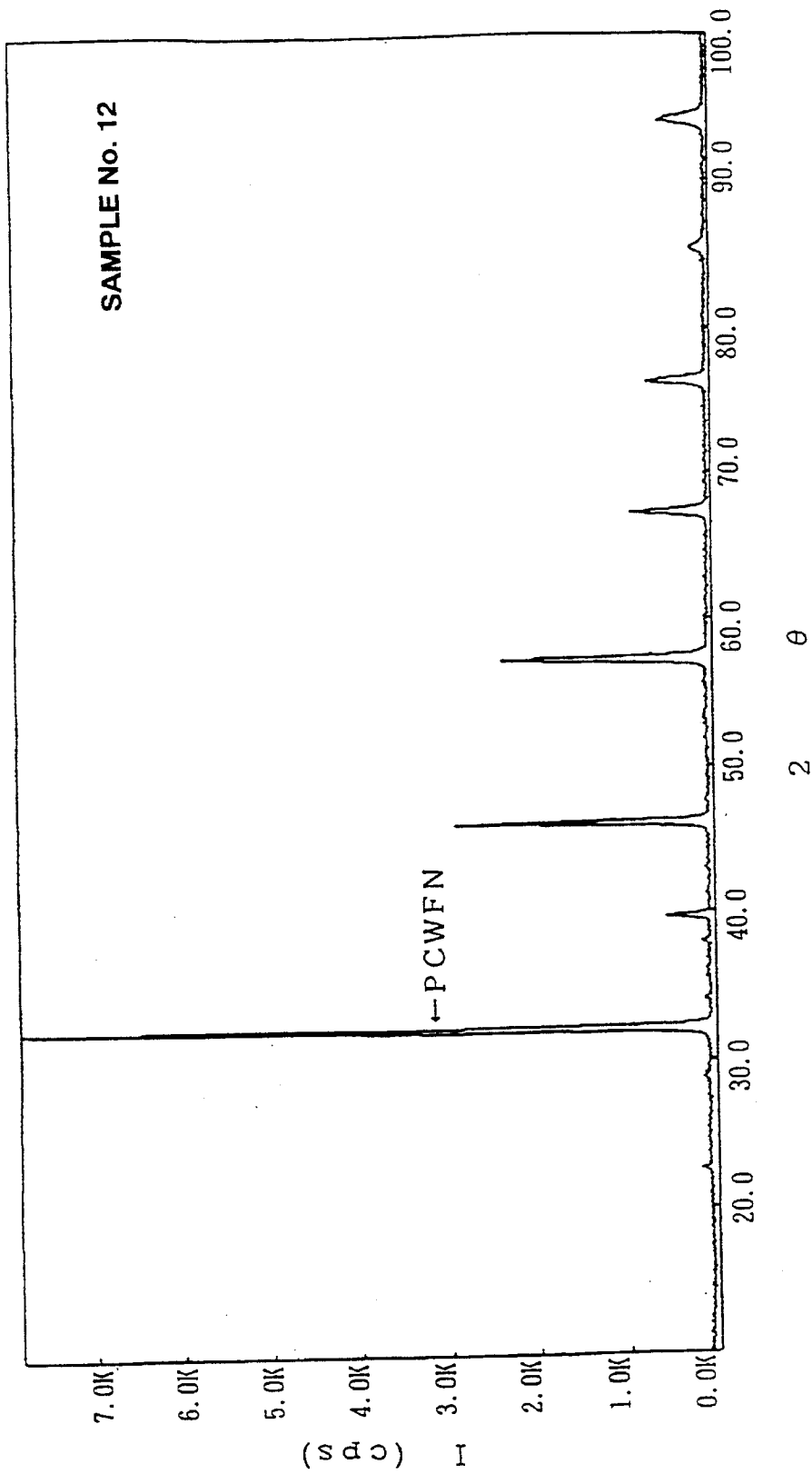
FIG. 1 is a diagram showing X-ray diffraction pattern of sample No. 12 in Example.

The dielectric ceramic material of the invention contains a primary phase of the composition: $(Pb_{1-z}Ca_z)(W_sFe_tNb_u)O_3$ wherein letters z, s, t, and u are molar fractions of calcium Ca, tungsten W, iron Fe, and niobium Nb, respectively. Herein Pb is partially replaced by Ca such that the molar fraction of calcium, z, is in the range: $0.3 \leq z \leq 0.9$. If the partial replacement by Ca exceeds the range, low-temperature firing is lost. If the partial replacement by Ca is below the range, the temperature coefficient τf of resonance frequency is increased in a (+) direction. The calcium molar fraction z is preferably in the range: $0.3 \leq z \leq 0.8$, more preferably $0.4 \leq z \leq 0.75$, within which better low-temperature firing, higher dielectric constant and a lower temperature coefficient τf of resonance frequency are available.

Letters s, t, and u representative of the molar fractions of W, Fe, and Nb, respectively, are in the range:

s+t+u=1, $0.01 \leq s \leq 0.2$, $0.5 \leq t \leq 0.6$, and $0.2 \leq u \leq 0.49$.

The reason of limitation of these molar fractions is described below. The molar fraction s of W is limited to the range of 0.01 to 0.2 because low-temperature firing is difficult with s of less than 0.01 whereas the temperature coefficient τf of resonance frequency increases in a (+) direction with s of more than 0.2. The molar fraction t of Fe is limited to the range of 0.5 to 0.6 because low-temperature firing is difficult with t of less than 0.5 whereas the temperature coefficient τf of resonance frequency increases in a (+) direction with t of more than 0.6. The molar fraction u of Nb is limited to the range of 0.2 to 0.49 because the temperature coefficient τf of resonance frequency increases in a (+) direction with u of less than 0.2 whereas low-temperature firing is difficult with u of more than 0.49. A dielectric constant ε of more than about 65 is obtained by controlling s, t and u to fall within the above-defined range. In preferred embodiments, a dielectric constant s of about 65 to 120, especially about 80 to 120 is obtained.

Better low-temperature firing and a lower temperature coefficient τf of resonance frequency are obtained when s, t and u are in the range: $0.02 \leq s \leq 0.1$, $0.5 \leq t \leq 0.55$, and $0.35 \leq u \leq 0.48$.

It is understood that a temperature coefficient τf of resonance frequency closer to zero is desirable. In general, a temperature coefficient τf of resonance frequency between +100 ppm/°C. and −100 ppm/°C. is desirable as microwave dielectric material. The material of the present invention has τf within ±100 ppm/°C., in preferred embodiments, within ±60 ppm/°C., especially within ±50 ppm/°C., most preferably within ±30 ppm/°C.

It is also desirable that the dielectric constant ε be as high as possible. Since the size of dielectric resonators is in inverse proportion to the square root of the dielectric constant of dielectric materials, an increased value of ε is essential for size reduction of resonators. Therefore a large value of ε is important.

The identity of the phase $(Pb_{1-z}Ca_z)(W_sFe_tNb_u)O_3$ is confirmed by an X-ray diffraction spectrum (XRD). In one embodiment, the dielectric ceramic material of the invention consists of a single phase of $(Pb_{1-z}Ca_z)(W_sFe_tNb_u)O_3$.

In another embodiment, the dielectric ceramic material contains $(Pb_{1-z}Ca_z)(W_sFe_tNb_u)O_3$ as a primary phase and at least one member selected from $(Pb_{1-x}Ca_x)(Fe_{1/2}Nb_{1/2})O_3$, $Ca(Fe_{1/2}Nb_{1/2})O_3$, and pyrochlores containing Pb and Nb such as $Pb_3Nb_4O_{13}$ as a distinct phase. Letter x representative of a molar fraction of calcium is in the range: $0.3 \leq x \leq 0.91$, especially $0.3 \leq x \leq 0.9$. The presence of these distinct phases can also be confirmed by XRD. The amount of the primary phase as determined by XRD or electron probe microanalysis (EPMA) is generally at least 70% by weight, especially 80 to 100% by weight. The primary phase generally has a mean grain size of 0.5 to 15 μm, especially 1 to 10 μm.

Preferably, the dielectric ceramic material contains a sintering aid as a subordinate component so that it may be fired at a lower temperature. The sintering aids used herein include oxides such as ZnO, $Bi_2O_3$, CuO, PbO, and $PbSiO_3$, with $Pb_5Ge_3O_{11}$ being most preferred. The amount of $Pb_5Ge_3O_{11}$ is preferably up to 10.0% by weight, more preferably 2.0 to 5.0% by weight of the total weight of the primary and distinct phases, that is, the total weight of lead, calcium, tungsten, iron, and niobium oxides. Trace amounts of $Pb_5Ge_3O_{11}$ would be meaningless for its purpose of improving low-temperature firing ability whereas excess amounts of $Pb_5Ge_3O_{11}$ would lower Q·f value and exacerbate its temperature property. The sintering aids are left at grain boundaries after sintering.

Further, manganese may be contained in the dielectric ceramic material of the invention, preferably in an amount of up to 0.5% by weight, more preferably up to 0.4% by weight, especially 0.05 to 0.3% by weight of the total weight of the primary and distinct phases, that is, the total weight of lead, calcium, tungsten, iron, and niobium oxides (exclusive of the sintering aid). Inclusion of manganese improves the insulation resistance of the material. Manganese is generally present in the primary phase and sometimes in the distinct phase(s) after sintering.

Next, a method for preparing a dielectric ceramic material according to the invention is described.

The starting raw materials include oxides of metal elements constituting the dielectric ceramic material, for example, lead oxide, calcium oxide, tungsten oxide, iron oxide, and niobium oxide. Also included are various compounds which can be converted into oxides by firing, for example, carbonates (e.g., calcium carbonate) and oxalates. The starting raw materials are mixed such that the proportion of respective metal elements be identical with the final composition. The starting raw materials are generally in the form of particles preferably having a mean particle size of about 0.5 to 10 μm. Some components may be added as a solution of a sulfate or nitrate salt.

Preferably the starting raw materials in powder form are mixed by a wet process using a ball mill or the like. The mixture is then calcined. The mixing and calcining steps are done separately for two systems, lead iron-tungstate $Pb(Fe_{2/3}W_{1/3})O_3$, which is referred to as PFW, and partially-replaced-by-calcium lead iron-niobate $(Pb_{1-x}Ca_x)(Fe_{1/2}Nb_{1/2})O_3$, which is referred to as PCFN, hereinafter. Unless the two systems are mixed and calcined together, $CaWO_4$ is formed, failing to synthesize the final composition $(PbCa)(WFeNb)O_3$ free of $CaWO_4$.

The PFW system starts with raw materials PbO, $Fe_2O_3$ and $WO_3$. Separately, the PCFN system starts with raw materials PbO, $Fe_2O_3$, $Nb_2O_5$, and $CaCO_3$. In the PCFN system, the partial replacement of Pb by Ca is preferably set such that the molar fraction of calcium x may fall in the range: $0.3 \leq x \leq 0.91$. If the partial replacement of Pb by Ca exceeds this range, low-temperature firing would become difficult. If the partial replacement of Pb by Ca is below this range, the temperature coefficient if of resonance frequency would increase in a (+) direction. Better low-temperature firing, higher dielectric constant, and a lower temperature coefficient τf of resonance frequency are obtained when x is in the range: $0.4 \leq x \leq 0.7$.

The calcination step is preferably carried out at a temperature of about 800° to about 900° C. for the PFW system and about 1,000° to about 1,200° C. for the PCFN system, both for about 1 to about 4 hours. After calcination, the systems are preferably milled by a wet process in a ball mill or the like. At the end of milling, a mean particle size of about 0.7 to 3.0 μm is desirable.

Then the PFW and PCFN systems are combined in such a proportion that the molar fraction of PFW, y, is in the range: $0.01 \leq y \leq 0.7$ provided that the total of the molar fractions of PFW and PCFN is unity. Beyond the range, the temperature coefficient τf of resonance frequency would increase in a (+) direction. Below the range, low-temperature sintering would become difficult. Better results are obtained when y is in the range: $0.05 \leq y \leq 0.4$.

The mixture of the PFW and PCFN systems in the above-defined proportion is then calcined. This (second) calcination step is preferably carried out in air at a temperature of about 700° to 1,100° C., more preferably about 900° to 1,050° C., especially about 900° to 1,000° C. for about 1 to about 4 hours. At the end of calcination, the mixture is ground in a ball mill or the like, preferably to a mean particle size of about 0.7 to 1.5 μm. There is obtained calcined powder.

Next, a binder such as polyvinyl alcohol is added to the calcined powder, which is shaped into a compact of desired shape. A sintering aid, typically $Pb_5Ge_3O_{11}$ (PGO) is generally mixed with the calcined powder prior to shaping. Alternatively, the sintering aid may be added to the raw material prior to the second calcination step. In this case, the sintering aid is added to the mixture of PFW and PCFN systems, which is calcined and if desired, thereafter combined with another calcined powder and PGO.

In either case, the amount of PGO as the sintering aid is preferably set to 10.0% by weight or less, more preferably about 2.0 to 5.0% by weight of the total weight of the dielectric material (PFW+PCFN) because low-temperature firing is facilitated. Preferably the sintering aid such as PGO has a mean particle size of up to 1.0 μm, especially 0.5 to 1.0 μm when blended with the calcined powder. A larger particle size would require that the firing temperature be elevated.

In the preferred embodiment wherein manganese is contained, a manganese compound is added. The manganese compounds include oxides such as $MnO_2$ and compounds which will convert into oxides upon firing, such as carbonates and oxalates. Also useful are composite oxides with another component, for example, $(Pb\ Ca)(Mn_{1/3}Nb_{2/3})O_3$, etc. Typically these compounds have a mean particle size of about 0.5 to 1.0 μm. Alternatively, a sulfate or nitrate solution may be added. The amount of the manganese compound added is generally up to 0.5% by weight, especially 0.05 to 0.3% by weight calculated as Mn of the total weight of PFW and PCFN systems, that is, the total weight of lead, calcium, tungsten, iron, and niobium oxides. The manganese compound may be added at the same stage as the sintering aid.

Finally the compact is fired generally in air at a temperature of about 900° to 1,100° C., especially about 900° to 1,050° C. With $Pb_5Ge_3O_{11}$ added as the sintering aid, a dense sintered body having mechanical strength can be obtained even when the compact is fired at a lower temperature of about 90.0 to 950° C. The holding time at the firing temperature is generally about 1 to about 3 hours.

Resonators are fabricated from the high-frequency dielectric material of the invention, for example, by adding a vehicle including an organic binder and organic solvent to the calcined powder to form a paste, building up layers of the paste by a printing or sheet technique, forming conductor strips between adjacent dielectric layers, and firing the assembly. The conductor used for the internal electrode layers may be an inexpensive low-melting metal such as silver and silver alloy.

The dielectric material of the invention may be used in resonators, band-pass filters, duplexers and the like. It is also applied to chip capacitors wherein dielectric layers and internal electrode layers are alternately formed and fired before external electrodes are applied. These parts can perform at high frequencies of 300 MHz to 3 GHz.

EXAMPLE

Examples of the present invention are given below by way of illustration and not by way of limitation.

Predetermined amounts of starting raw materials PbO, $Fe_2O_3$, and $WO_3$ were weighed, mixed and calcined at the temperature shown in Table 2 for 2 hours, obtaining a PFW system. Predetermined amounts of starting raw materials PbO, $CaCO_3$, $Fe_2O_3$, and $Nb_2O_5$ were weighed, mixed and calcined at the temperature shown in Table 2 for 2 hours, obtaining a PCFN system. These systems were separately wet milled in a ball mill.

The two systems were weighed and blended as shown in Table 2 so as to give the final composition shown in Table 1, mixed and calcined at the temperature shown in Table 2 for 2 hours. This yielded a calcined product having $(Pb_{1-z}Ca_z)(W_sFe_tNb_u)O_3$, which is sometimes referred to as PCWFN, as a primary phase.

Next the PCWFN resulting from calcination was wet milled in a ball mill, obtaining calcined powder having a mean particle size of 0.9 μm as measured by a laser diffractometry particle size distribution analyzer.

Separately, sintering aid $Pb_5Ge_3O_{11}$ (often referred to as PGO) was prepared by mixing predetermined amounts of lead oxide (PbO) and germanium dioxide ($GeO_2$) in a wet system and heating the mixture at 500° C. for reaction. The product was wet milled in a ball mill to a mean particle size of 1.0 μm.

The sintering aid PGO was added to the calcined power in an amount of 3.0% by weight and wet milled in a ball mill.

Polyvinyl alcohol as an organic binder was added to the calcined powder having PGO blended therein to form a paste, which was granulated and shaped under a pressure of 2 ton/cm² into a columnar compact having a diameter of 12.5 mm and a thickness of 12 mm.

The compact was fired in air at the temperature shown in Table 2 for 2 hours. On firing, the compact was placed in a casing together with the calcined powder to bury the compact in the powder for preventing evaporation of Pb from the compact. The sintered body was machined to a diameter of 10 mm and a thickness of 5 mm. In this way, there were obtained inventive dielectric samples, Nos. 2–17, as shown in Table 1. It is noted that sample Nos. 1 and 13 were free of the sintering aid PGO, and sample Nos. 15 and 16 contained 6 and 10% by weight of PGO.

Figure 2:
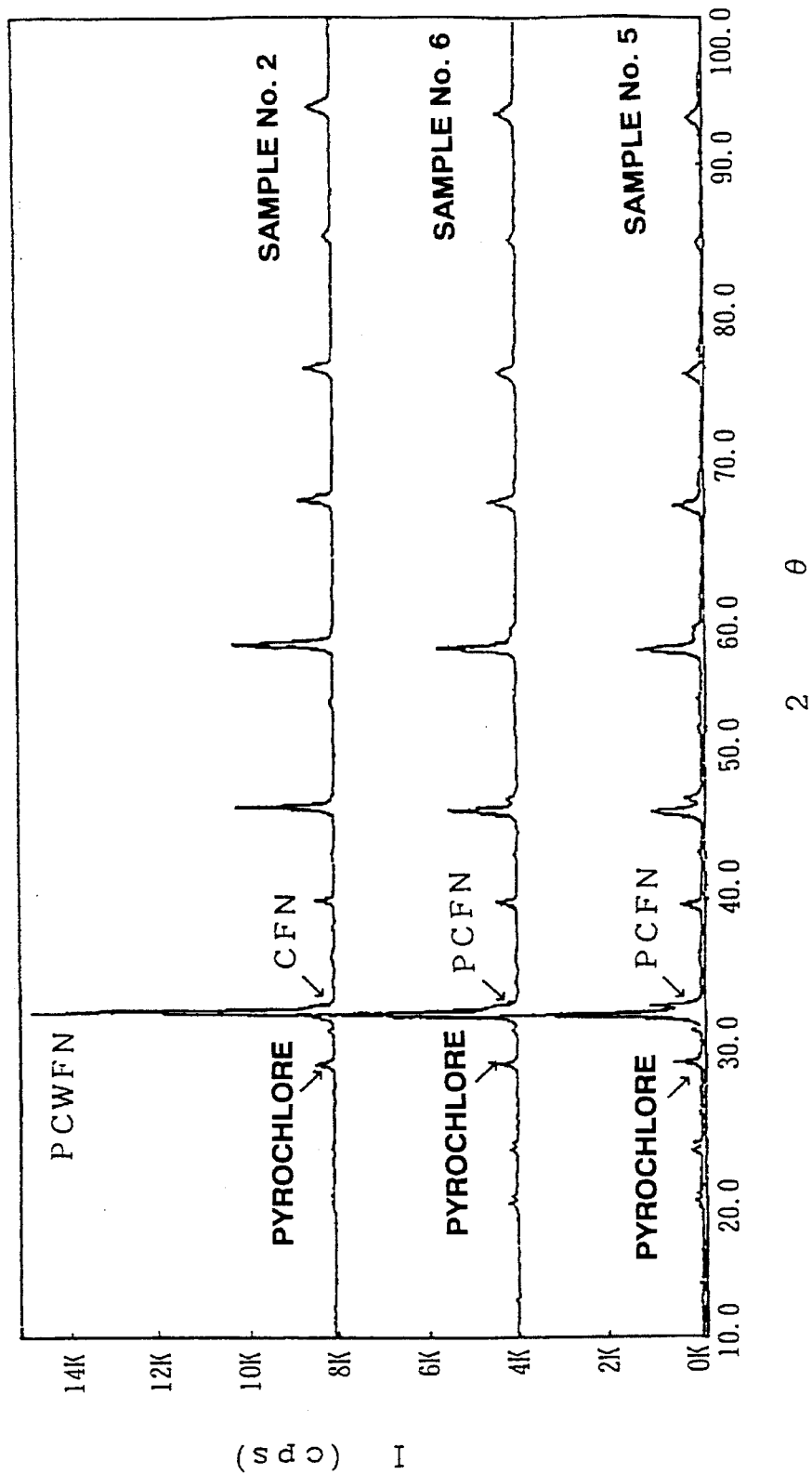
FIG. 2 is a diagram showing X-ray diffraction patterns of sample Nos. 2, 5, and 6.

These samples were analyzed for phase system by X-ray diffractometry. The diffraction pattern of sample No. 12 is shown in FIG. 1, indicating that sample No. 12 consisted essentially of a single phase of PCWFN. The diffraction patterns of sample Nos. 2, 5 and 6 are shown in FIG. 2. Sample No. 2 contained PCWFN as a primary .phase and $Ca(Fe_{1/2}Nb_{1/2})O_3$ (CFN) and pyrochlore containing Pb and Nb, especially $Pb_3Nb_4O_{13}$ as distinct phases. Sample Nos. 5 and 6 contained PCWFN as a primary phase and PCFN and pyrochlore as distinct phases.

For comparison purposes, dielectric sample Nos. 18 to 21 were prepared by the same procedure as above except that their composition was outside the scope of the invention as shown Table 1.

The dielectric samples were measured for electrical properties, dielectric constant ε, Q·f value, resonance frequency $f_0$, and temperature coefficient τf of resonance frequency by a dielectric rod resonator method. τf was calculated by measuring the resonance frequency at intervals of 20° C. from −40° C. to +80° C. and determining changes from the reference value at +20° C. The results are shown in Table 2.

ferent temperatures as shown in Table 3. The sintered samples were measured for density (g/cm³). As seen from Table 3, addition of $Pb_5Ge_3O_{11}$ facilitates low-temperature firing.

TABLE 1

| Sample No. | Pb(1-z) | Ca(z) | W(s) | Fe(t) | Nb(u) |
|---|---|---|---|---|---|
| 1 | 0.44 | 0.56 | 0.1 | 0.55 | 0.35 |
| 2 | 0.44 | 0.56 | 0.1 | 0.55 | 0.35 |
| 3 | 0.36 | 0.64 | 0.0667 | 0.5333 | 0.4 |
| 4 | 0.36 | 0.64 | 0.0667 | 0.5333 | 0.4 |
| 5 | 0.28 | 0.72 | 0.0333 | 0.5167 | 0.45 |
| 6 | 0.28 | 0.72 | 0.0333 | 0.5167 | 0.45 |
| 7 | 0.44 | 0.56 | 0.0667 | 0.5333 | 0.4 |
| 8 | 0.525 | 0.475 | 0.0167 | 0.5083 | 0.475 |
| 9 | 0.505 | 0.495 | 0.0333 | 0.5167 | 0.45 |
| 10 | 0.52 | 0.48 | 0.0667 | 0.5334 | 0.4 |
| 11 | 0.46 | 0.54 | 0.0333 | 0.5167 | 0.45 |
| 12 | 0.43 | 0.57 | 0.0167 | 0.5083 | 0.475 |
| 13 | 0.45 | 0.55 | 0.04 | 0.52 | 0.44 |
| 14 | 0.45 | 0.55 | 0.04 | 0.52 | 0.44 |
| 15 | 0.45 | 0.55 | 0.04 | 0.52 | 0.44 |
| 16 | 0.45 | 0.55 | 0.04 | 0.52 | 0.44 |
| 17 | 0.46 | 0.54 | 0.0667 | 0.5333 | 0.4 |
| 18* | <u>0.7625</u> | <u>0.2375</u> | 0.0167 | 0.5083 | 0.475 |
| 19* | <u>0.715</u> | <u>0.285</u> | <u>0.233</u> | <u>0.617</u> | <u>0.15+ee</u> |
| 20* | <u>+e,uns</u> | <u>0.9025</u> | 0.0167 | 0.5083 | 0.475 |
| 21* | <u>0.0975</u><br><u>0.734</u> | 0.266 | 0.0167 | 0.5083 | 0.475 |

*comparison (Underlines indicate outside the scope of the invention.)

TABLE 3

| | Density (g/cm³) at firing temperature | | |
|---|---|---|---|
| Sample No. | 900° C. | 950° C. | 1000° C. |
| 1 | 5.48 | 6.14 | 6.43 |
| 2 | 6.00 | 6.49 | 6.43 |

Figure 3:
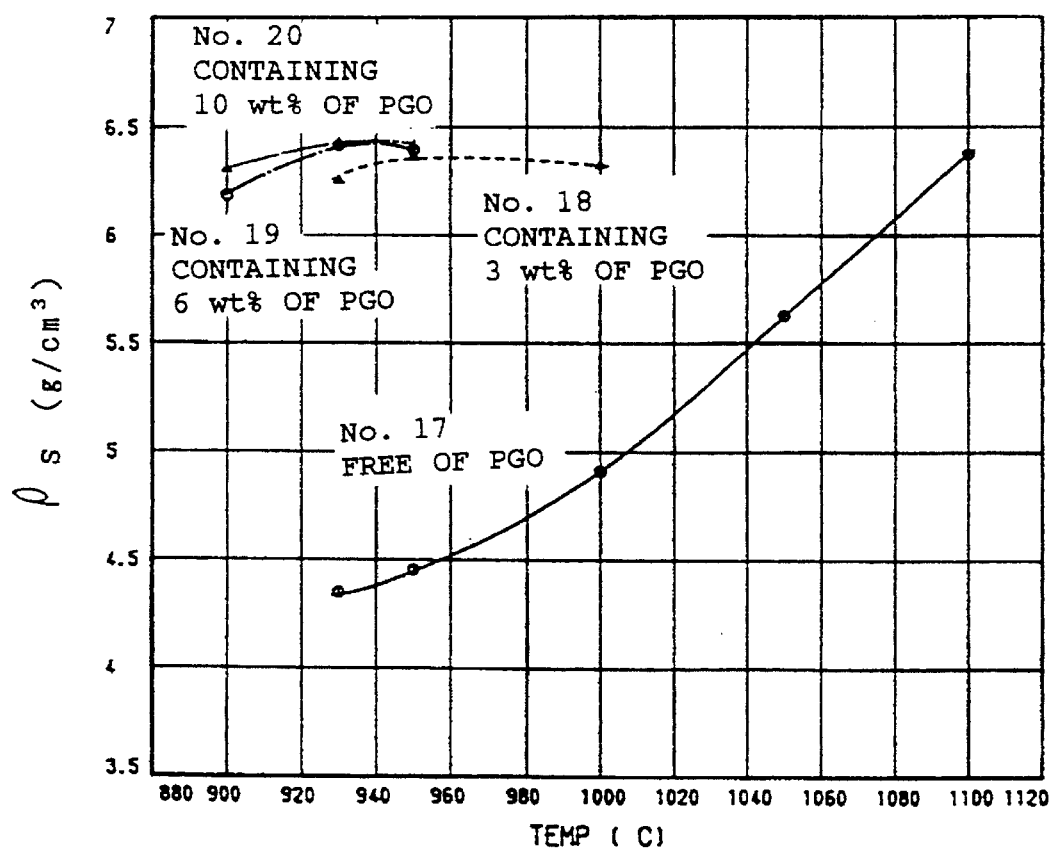
FIG. 3 is a graph plotting the density versus firing temperature of sample Nos. 13, 14, 15, and 16.

To further examine the relationship of fired density to firing temperature, several samples were fired at different temperatures and the sintered samples were measured for density. The test samples were sample Nos. 13 to 16 of the same composition with the difference that No. 13 was free of $Pb_5Ge_3O_{11}$ (PGO) and Nos. 14, 15, and 16 contained 3, 6, and 10% by weight of PGO, respectively. The results are plotted in FIG. 3. It is seen that the sintering aid permits the composition to be fired at lower temperatures.

Additional samples, Nos. 31 to 35, were similarly prepared by using $Pb(Fe_{2/3}W_{1/3})O_3$ as PFW and $(Pb_{0.325}Ca_{0.675})(Fe_{1/2}Nb_{1/2})O_3$ as PCFN, blending them in a ratio: y (PFW)=0.21 and 1-y (PCFN)=0.79, adding 3.0% by weight of PGO and an amount of $MnCO_3$ as shown in Table 4, and firing the mixture at a temperature of 930° C. The results are shown in Table 4.

TABLE 2

| Sample No. | x (Ca) | y (PFW) | 1-y (PCFN) | Firing temp. (°C.) | ε | Q · f (GHz) | τf (ppm/°C.) | of (GHz) | Calcining temperature (°C.) | | | Addition of PGO |
|---|---|---|---|---|---|---|---|---|---|---|---|---|
| | | | | | | | | | PFW | PCFN | PFW-PCFN | |
| 1 | 0.8 | 0.3 | 0.7 | 1000 | 91.3 | 1643 | +7.3 | 4.38 | 800 | 1000 | 750 | no |
| 2 | 0.8 | 0.3 | 0.7 | 1000 | 84.6 | 1976 | −13 | 4.56 | 800 | 1000 | 750 | 3 wt % |
| 3 | 0.8 | 0.2 | 0.8 | 950 | 77.3 | 1760 | +30 | 4.76 | 850 | 1150 | 750 | 3 wt % |
| 4 | 0.8 | 0.2 | 0.8 | 1000 | 71.4 | 1520 | −29 | 4.95 | 850 | 1150 | 750 | 3 wt % |
| 5 | 0.8 | 0.1 | 0.9 | 930 | 67.1 | 1638 | ±5 | 5.11 | 850 | 1150 | 750 | 3 wt % |
| 6 | 0.8 | 0.1 | 0.9 | 1000 | 65.3 | 2270 | −24 | 5.18 | 850 | 1150 | 750 | 3 wt % |
| 7 | 0.7 | 0.2 | 0.8 | 950 | 86.6 | 1299 | +24 | 4.50 | 850 | 1150 | 750 | 3 wt % |
| 8 | 0.7 | 0.05 | 0.95 | 1000 | 112.2 | 2734 | +52 | 3.95 | 850 | 1100 | 900 | 3 wt % |
| 9 | 0.55 | 0.1 | 0.9 | 930 | 109.4 | 3537 | +52 | 4.00 | 850 | 1150 | 900 | 3 wt % |
| 10 | 0.6 | 0.2 | 0.8 | 930 | 107.2 | 3790 | +48 | 4.50 | 850 | 1150 | 900 | 3 wt % |
| 11 | 0.6 | 0.1 | 0.9 | 1000 | 95.7 | 3839 | +9.6 | 4.28 | 850 | 1150 | 900 | 3 wt % |
| 12 | 0.6 | 0.05 | 0.95 | 1000 | 88.4 | 3784 | −6.0 | 4.45 | 850 | 1150 | 900 | 3 wt % |
| 13 | 0.625 | 0.12 | 0.88 | 1100 | 93.9 | 3948 | −5.7 | 4.32 | 850 | 1150 | 970 | no |
| 14 | 0.625 | 0.12 | 0.88 | 950 | 93.1 | 4031 | +9.7 | 4.34 | 850 | 1150 | 970 | 3 wt % |
| 15 | 0.625 | 0.12 | 0.88 | 930 | 93.0 | 3330 | +27 | 4.34 | 850 | 1150 | 970 | 6 wt % |
| 16 | 0.625 | 0.12 | 0.88 | 930 | 91.4 | 2222 | +50 | 4.38 | 850 | 1150 | 970 | 10 wt % |
| 17 | 0.675 | 0.2 | 0.8 | 950 | 93.2 | 5135 | +11 | 4.33 | 850 | 1150 | 900 | 3 wt % |
| 18* | 0.25 | 0.05 | 0.95 | 950 | not resonate, unmeasurable | | | | 850 | 1000 | 900 | 3 wt % |
| 19* | 0.95 | 0.7 | 0.3 | 900 | not resonate, unmeasurable | | | | 850 | 1150 | 900 | 3 wt % |
| 20* | 0.95 | 0.05 | 0.95 | 1000 | not sintered | | | | 850 | 1150 | 900 | 3 wt % |
| 21* | 0.28 | 0.05 | 0.95 | 1000 | 160 | — | +202 | 3.31 | 850 | 1200 | 950 | 3 wt % |

*comparison

The effectiveness of the present invention is evident from Table 2. The composition and preparation method within the scope of the invention offers dielectric ceramic materials which can be fired at relatively low temperature and have a low temperature coefficient τf of resonance frequency in the microwave frequencies, a high dielectric constant ε, and a high Q·f value.

Sample Nos. 1 and 2 are of the same composition, but sample No. 1 does not contain and sample No. 2 contains sintering aid $Pb_5Ge_3O_{11}$. These samples were fired at dif-

TABLE 4

| Sample No. | Amount of Mn added (Mn wt %) | Insulation resistivity (Ω-cm) | ε | Q · f (GHz) | τf (ppm/°C.) | $f_0$ (GHz) |
|---|---|---|---|---|---|---|
| 31 | 0 | 3.6 × 10⁶ | 96.3 | 4129 | +20.4 | 4.27 |
| 32 | 0.05 | 8.6 × 10⁶ | 95.0 | 4337 | +18.5 | 4.29 |
| 33 | 0.1 | 5.3 × 10⁷ | 97.0 | 4678 | +15.5 | 4.26 |
| 34 | 0.2 | 1.6 × 10¹⁰ | 97.3 | 4311 | +15.3 | 4.24 |

TABLE 4-continued

| Sample No. | Amount of Mn added (Mn wt %) | Insulation resistivity (Ω-cm) | ε | Q·f (GHz) | τ_f (ppm/°C.) | f_0 (GHz) |
|---|---|---|---|---|---|---|
| 35 | 0.3 | $9.8 \times 10^{10}$ | 96.7 | 4066 | +11.8 | 4.26 |

The data clearly show an increase of insulation resistance due to inclusion of Mn.

The dielectric ceramic materials of the invention offer a specific dielectric constant ε of at least 65, a Q·f value of about 1,300 GHz or higher, a temperature coefficient τf of resonance frequency of about 50 ppm/° C. or lower in absolute magnitude. They can be fired at low temperatures of below about 1,000° C., ensuring co-firing with silver electrodes capable of reducing a loss of microwaves.

Japanese Patent Application No. 141450/1993 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A dielectric ceramic material comprising lead, calcium, tungsten, iron, and niobium in oxide form,
    containing a primary phase of the composition:

$$(Pb_{1-z}Ca_z)(W_sFe_tNb_u)O_3$$

wherein z, s, t, and u are representative of the molar fractions of Ca, W, Fe, and Nb, respectively, and are in the range:

$0.3 \leq z \leq 0.9,$ $s+t+u=1,$ $0.01 \leq s \leq 0.2,$ $0.5 \leq t \leq 0.6,$ and $0.2 \leq u \leq 0.49$ and further containing $Pb_5Ge_3O_{11}$ as a sintering aid in an amount sufficient to enhance the low-temperature firing of said primary phase.

2. The dielectric ceramic material of claim 1 wherein the molar fractions s, t and u are in the range:

$0.02 \leq s \leq 0.1,$ $0.5 \leq t \leq 0.55,$ and $0.35 \leq u \leq 0.48.$

3. The dielectric ceramic material of claim 1 which further contains at least one member selected from the group consisting of $(Pb_{1-x}Ca_x)(Fe_{1/2}Nb_{1/2})O_3$ wherein x is in the range $0.3 \leq x \leq 0.91$, $Ca(Fe_{1/2}Nb_{1/2})O_3$, and $Pb_3Nb_4O_{13}$ as a distinct phase.

4. The dielectric ceramic material of claim 1 wherein said sintering aid is present in an amount of up to 10.0% by weight of the total weight of the lead, calcium, tungsten, iron, and niobium oxides.

5. The dielectric ceramic material of claim 1 which further contains manganese.

6. The dielectric ceramic material of claim 5 wherein manganese is present in an amount of up to 0.5% by weight of the total weight of the lead, calcium, tungsten, iron, and niobium oxides.

7. The dielectric ceramic material of claim 1, which is prepared by a method comprising the steps of:
    forming a first ceramic material composed mainly of $Pb(Fe_{2/3}W_{1/3})O_3$ and a second ceramic material composed mainly of $(Pb_{1-x}Ca_x)(Fe_{1/2}Nb_{1/2})O_3$ wherein molar fraction x is in the range:

$0.3 \leq x \leq 0.91,$ mixing the first and second ceramic materials,
    calcining the mixture,
    adding the sintering aid to the calcined mixture, and
    firing the mixture and the sintering aid.

8. The dielectric ceramic material of claim 7 wherein the first and second ceramic materials are mixed to form a mixture represented by the compositional formula:

$$y[Pb(Fe_{2/3}W_{1/3})O_3]-(1-y)[(Pb_{1-x}Ca_x)(Fe_{1/2}Nb_{1/2})O_3]$$

wherein x is as defined above and y is in the range: $0.01 \leq y \leq 0.7.$

9. The dielectric ceramic material of claim 8 wherein $0.05 \leq y \leq 0.4.$

10. The dielectric ceramic material of claim 7 wherein the material is fired at a temperature of up to 1,100° C.

* * * * *